July 9, 1929.  G. H. VINETTE  1,720,307

VEHICLE BRAKE

Filed Sept. 2, 1926

INVENTOR
George H. Vinette
BY
Francis D. Sherlock
ATTORNEY

Patented July 9, 1929.

1,720,307

UNITED STATES PATENT OFFICE.

GEORGE H. VINETTE, OF DETROIT, MICHIGAN.

VEHICLE BRAKE.

Application filed September 2, 1926. Serial No. 133,250.

The present invention relates to vehicle brakes and more especially to external fluid operated brakes.

Among the objects of the invention is the provision of a simple and effective operating mechanism.

Another object is brake operating mechanism which will be constructed of few parts, economical to produce and easy to assemble.

Other objects will readily occur to those skilled in the art upon reference to the following description and accompanying drawings in which:—

Figure 1:
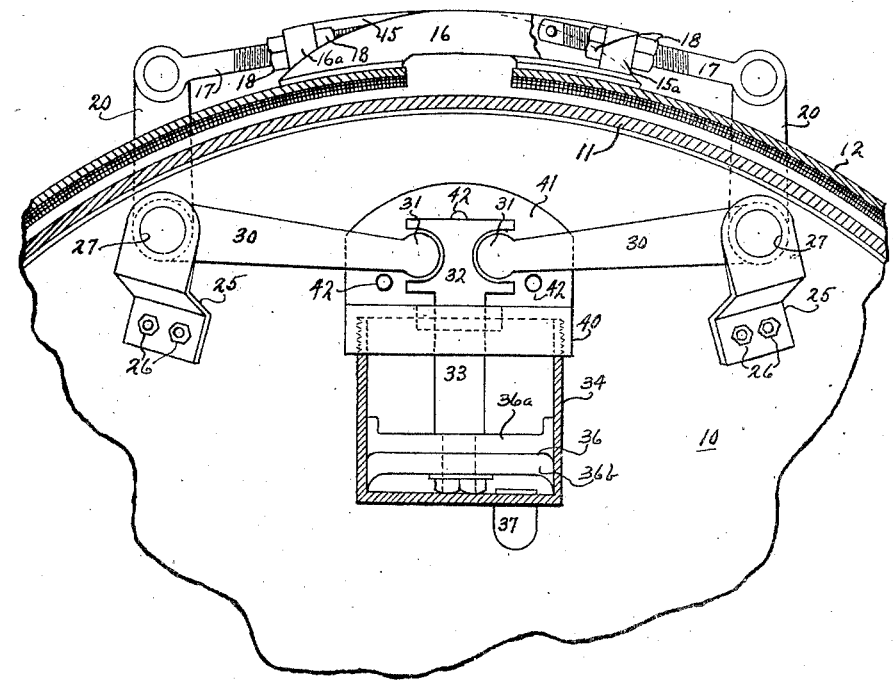
Fig. 1 is a side elevation of the mechanism with parts in section.

In the drawings, the anchor plate for the brake is indicated at 10 with the drum at 11 and the brake band at 12.

Figure 2:
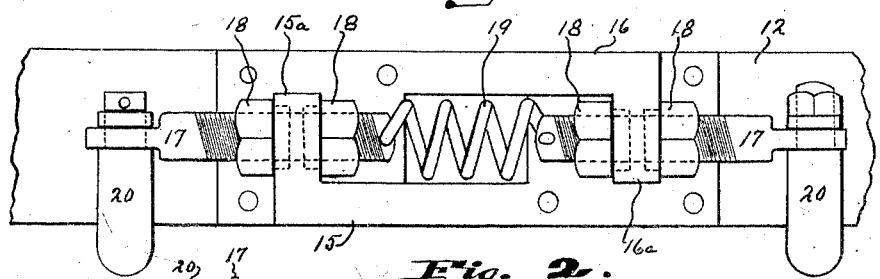
Fig. 2 is a plan view of the brake.

The ends of the brake band 12 will have secured thereto, as by riveting, extensions 15 and 16 which will be long enough to allow the free ends 15ª and 16ª thereof to pass each other as shown in Fig. 2. The free ends 15ª and 16ª will be provided with lateral perforated lugs, the perforations therethrough preferably being on the center line of the brake band. Extending through the perforations will be the threaded eye-bolts 17 which will be maintained in adjusted position by nuts 18, one on each side of lug ends 15ª and 16ª. These eye-bolts 17 will have their adjacent ends drilled for the reception of the ends of a tension spring 19 and through the eyes at the other ends will extend the outer ends of actuating levers 20.

Figures 3, 4:
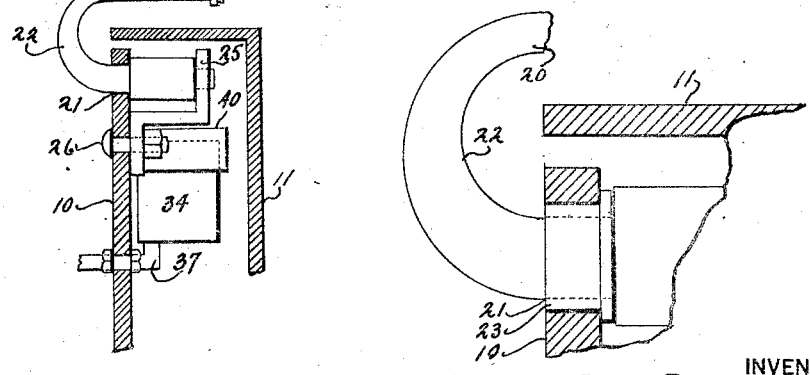
Fig. 3 is an end elevation of a portion of the mechanism with the drum and anchor plate in section.
Fig. 4 is an enlarged fragmentary view of a detail of construction.

The actuating levers 20 are each in the form of a bell crank with the outer arm extending laterally and curved so that it passes from inside the brake drum 11 through the anchor plate 10, in which it has a bearing as at 21, then curves upwardly and extends over the outside of the drum 11 as shown in Figs. 3 and 4. This curved portion 22 of the lever 20 will be tapered as shown or at least will be smaller in that portion outside of bearing 21 so that it may be inserted from the inside of plate 10 without difficulty. If the plate 10 is of unsuitable material and of insufficient thickness to furnish a proper bearing for the lever, a bearing bushing 23 may be used. An additional bearing for the lever will preferably be used and this is furnished by a stirrup member 25 bolted as at 26, or otherwise secured to plate 10 with its bearing opening 27 in proper alignment with bearing 21.

The other arms 30 of levers 20 will extend toward each other as shown and will be provided with preferably cylindrical ends 31 adapted to co-operate with a double yoke member 32 formed on the end of a piston rod 33 extending into cylinder 34 through the head 35. The inner end of rod 33 will connect with a suitable piston 36 which will preferably be made up of a guide plate 36ª and fluid tight cup 36ᵇ of any suitable flexible material such as leather. Beneath the piston 36 the cylinder 34 will be provided with a suitable inlet 37 for fluid which latter may be forced in under pressure from any suitable source.

The cylinder head 40 is provided with a side bracket portion 41 by means of which it may be secured as by bolting or riveting, holes 42 for this purpose being indicated.

The operation of the device is as follows: In normal release position arms 30 will be in a position in which the ends 31 are a short distance below a line from center to center of bearings 21 and 27 and in fully applied position a short distance above this line. When fluid is forced into the cylinder below the piston, arms 30 are moved up and cause the outer ends of lever 20 to move apart, thereby drawing together the ends of brake band 12.

Now, having described the invention and the preferred form of embodiment thereof, it is to be understood that the said invention is not to be limited to the specific details herein described and shown but only by the scope of the claims which follow:—

I claim:—

1. In a brake mechanism, a drum and a supporting plate at one end thereof, fluid pressure means attached to said plate within the drum, a pair of brackets attached to said plate within the drum and pivots mounted on said brackets, arms connected to said pivots and connecting to said fluid pressure means, said pivots extending through said plate and outwardly and then curving back to extend over said drum, a brake band extending around said drum and having overlapping extensions provided with perforated lugs at its ends, and links journaled on the ends of said pivot extensions and fixed adjustably in the holes in said lugs.

2. In a brake mechanism, a drum and a supporting plate at one end thereof, fluid pressure means attached to said plate within the drum, a pair of brackets attached to said plate within the drum and pivots mounted on said brackets, arms connected to said pivots and connecting to said fluid pressure means, said pivots extending through said plate and outwardly and then curving back to extend over said drum, a brake band extending around said drum and having overlapping extensions provided with perforated lugs at its ends, and links journaled on the ends of said pivot extensions and fixed adjustably in the holes in said lugs, said fluid pressure means embodying a rod movable radially of said drum and engaging the adjacent ends of the arms connected to said pivots.

GEORGE H. VINETTE.